(12) United States Patent
Fischer et al.

(10) Patent No.: US 6,428,042 B1
(45) Date of Patent: Aug. 6, 2002

(54) DUAL VOLUME AIR BAG WITH VENT

(75) Inventors: Kurt F. Fischer, Oxford; John G. Bauer, Troy; Roy C. Turnbull, Shelby Township, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/756,406

(22) Filed: Jan. 8, 2001

(51) Int. Cl.$^7$ ............................................... B60R 21/28
(52) U.S. Cl. .................. 280/739; 280/743.1; 280/743.2
(58) Field of Search ............................. 280/742, 728.1, 280/729, 739, 743.1, 743.2

(56) References Cited

U.S. PATENT DOCUMENTS

| | | | |
|---|---|---|---|
| 3,879,057 A | * 4/1975 | Kawashima et al. | ..... 280/743.2 |
| 3,990,726 A | * 11/1976 | Oka et al. | ..... 280/739 |
| 4,186,941 A | 2/1980 | Scholz et al. | |
| 5,048,863 A | 9/1991 | Henseler et al. | |
| 5,186,488 A | * 2/1993 | Takano | ..... 280/728.1 |
| 5,333,903 A | 8/1994 | Eyrainer et al. | |
| 5,405,166 A | 4/1995 | Rogerson | |
| 5,454,595 A | 10/1995 | Olson et al. | |
| 5,603,526 A | * 2/1997 | Buchanan | ..... 280/739 |
| 5,669,628 A | * 9/1997 | Kaufmann et al. | ..... 280/739 |
| 5,979,937 A | * 11/1999 | Yoshida et al. | ..... 280/739 |
| 6,017,058 A | * 1/2000 | Ross | ..... 280/743.1 |
| 6,142,517 A | * 11/2000 | Nakamura et al. | ..... 280/739 |

FOREIGN PATENT DOCUMENTS

| | | | |
|---|---|---|---|
| JP | 06286568 A | * | 10/1994 |
| JP | 06305391 A | * | 11/1994 |
| JP | 07329697 A | * | 12/1995 |
| JP | 408020305 A | * | 1/1996 |
| JP | 409249085 A | * | 9/1997 |
| JP | 2000142307 A | * | 5/2000 |

* cited by examiner

*Primary Examiner*—Lanna Mai
*Assistant Examiner*—Ruth Ilan
(74) *Attorney, Agent, or Firm*—Tarolli, Sundheim, Covell, Tummino & Szabo L.L.P.

(57) ABSTRACT

An inflatable vehicle occupant protection device (10) comprises flexible material defining an inflation fluid volume (42) for receiving inflation fluid. The material includes a first panel portion (30) on which is located a set of first points (A–D) and a second panel portion (40) on which is located a set of second points (A'–D'). A rupturable stitching section (50) holds the set of first points (A–D) closely adjacent the set of second points (A'–D') when the device (10) is in the deflated condition and when the device is in a partially inflated condition. The rupturable stitching section (50) is rupturable in response to the application of a force greater than a predetermined force in response to inflation of the protection device (10). Rupturing of the stitching section (50) enables movement of the first panel portion (30) away from the second panel portion (40).

7 Claims, 2 Drawing Sheets

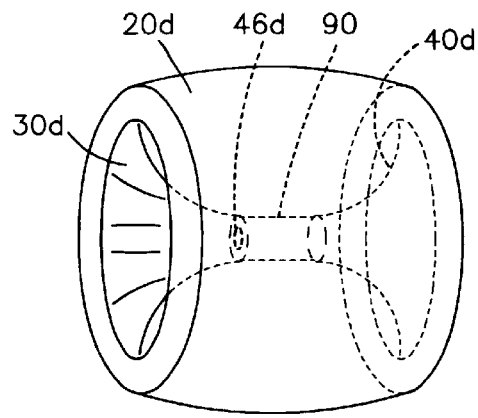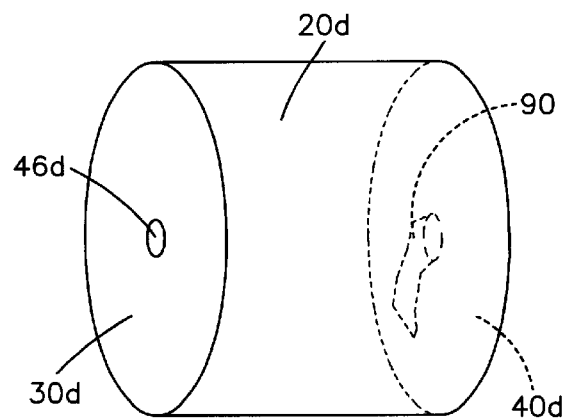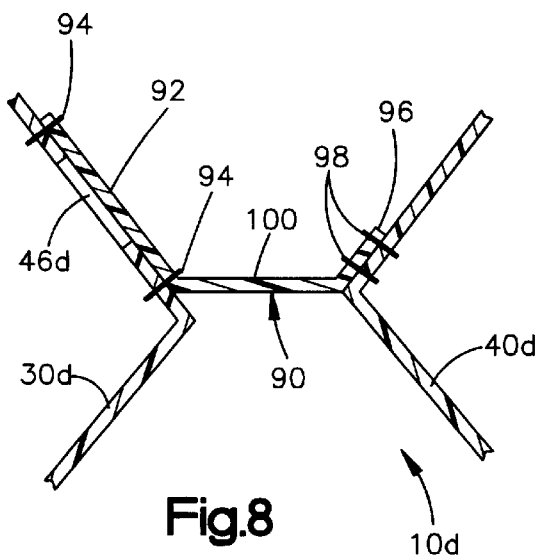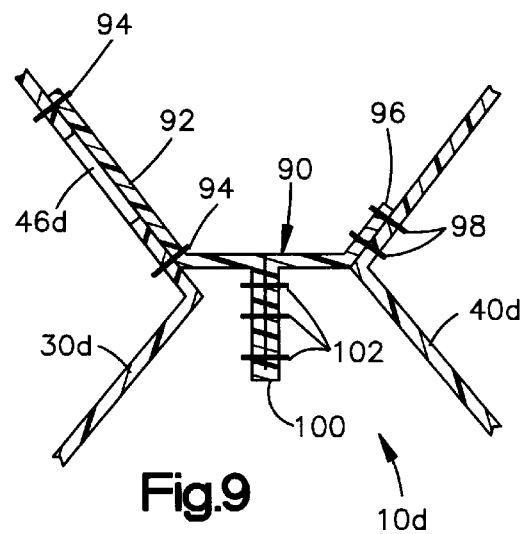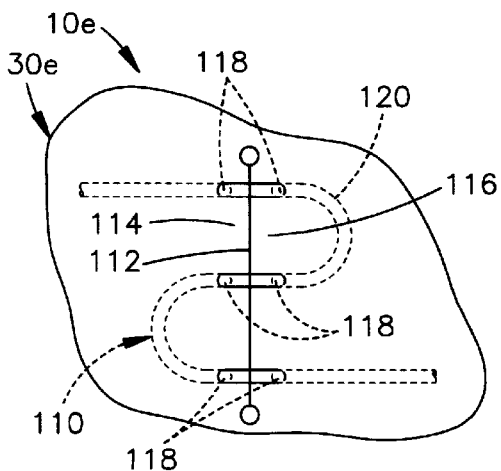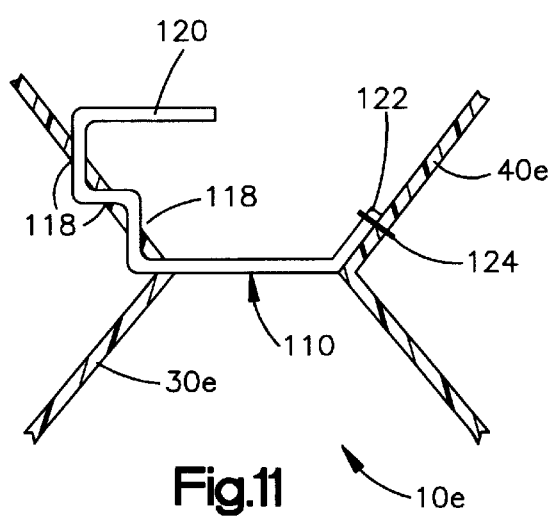

DUAL VOLUME AIR BAG WITH VENT

BACKGROUND OF THE INVENTION

The present invention relates to a vehicle occupant protection apparatus. In particular, the present invention relates to an air bag that is inflatable to two different volumes and that has a vent for discharging inflation fluid.

DESCRIPTION OF RELATED ART

A known air bag inflates to a first volume and then, upon rupturing of a tear seam or a rupturable stitching section, inflates further to a larger volume. It is known to provide such an air bag with a vent for discharging inflation fluid when the device is inflated to the larger volume. The vent opens, or is uncovered, when the air bag inflates from the partially inflated condition to the fully inflated condition.

If the vent is closed off by a stitching section that is unevenly stressed, then a portion only of the stitching section might open, without the remainder of the stitching section being opened. The vent opening might remain partially covered or closed, and the air bag might not vent inflation fluid in the desired manner.

SUMMARY OF THE INVENTION

The present invention is an inflatable vehicle occupant protection device for helping to protect an occupant of a vehicle. The device is inflatable from a deflated condition through a partially inflated condition to a fully inflated condition by inflation fluid from an inflation fluid source. The device comprises flexible material defining an inflation fluid volume for receiving inflation fluid, including a first panel portion on which is located a set of first points and a second panel portion on which is located a set of second points.

A rupturable stitching section holds the set of first points closely adjacent the set of second points when the device is in the deflated condition and when the device is in the partially inflated condition. The rupturable stitching section is rupturable in response to the application of a force greater than a predetermined force in response to inflation of the protection device. Rupturing of the stitching section enables movement of the first panel portion away from the second panel portion, thereby enabling movement of the device from the partially inflated condition to the fully inflated condition. All of the first points on the first panel portion move away from all of the second points on the second panel portion when the rupturable stitching section ruptures and the device moves from the partially inflated condition to the fully inflated condition.

The device includes a vent in the material for discharging inflation fluid from the device. The vent is blocked from fluid flow through the vent when the rupturable stitching section is not ruptured and the device is in the partially inflated condition. The vent opens to an open condition to permit flow of pressurized fluid from the device through the vent in response to rupturing of the rupturable stitching section and movement of the device from the partially inflated condition to the fully inflated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 6 is a pictorial view of a protection device in accordance with a third embodiment of the invention, shown in a partially inflated condition;

FIG. 7 is a view similar to FIG. 6 showing the protection device of FIG. 6 in a fully inflated condition;

FIG. 8 is a fragmentary sectional view of a tether that forms a part of the protection device of FIG. 6;

FIG. 9 is a view similar to FIG. 8 showing an alternative construction of the tether;

FIG. 10 is a view similar to FIG. 8 showing a further alternative construction of the tether; and FIG. 11 is a fragmentary elevational view of the tether of FIG. 10.

DETAILED DESCRIPTION OF THE INVENTION

Figure 1:
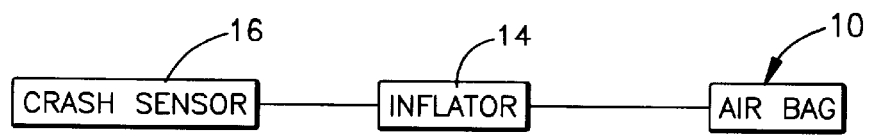
FIG. 1 is a block diagram of a vehicle occupant protection system including an inflatable vehicle occupant protection device.

The present invention relates to a vehicle occupant protection apparatus. In particular, the present invention relates to a protection device that is inflatable to two different volumes and that has a vent for discharging inflation fluid. As representative of the present invention, FIG. 1 illustrates an inflatable vehicle occupant protection device in the form of an air bag 10. Other inflatable vehicle occupant protection devices that can be used in accordance with the invention include, for example, inflatable seat belts, inflatable knee bolsters, inflatable head liners, inflatable side curtains, and knee bolsters operated by inflatable air bags.

The air bag 10 is preferably made from a flexible fabric material, such as woven nylon. The air bag 10 can alternatively be made from a non-woven material, such as plastic film.

The air bag 10 forms part of a vehicle occupant protection system 12. The system 12 includes an inflator 14 for inflating the air bag 10 and a crash sensor 16 for actuating the inflator. The inflator 14 preferably contains a stored quantity of pressurized inflation fluid and an ignitable material for heating the inflation fluid. The system 12 alternatively could include an inflator that uses the combustion of gas-generating material to generate inflation fluid in the form of gas to inflate the air bag 10, or an inflator that contains only a stored quantity of pressurized inflation fluid for inflating the air bag.

Figure 3:
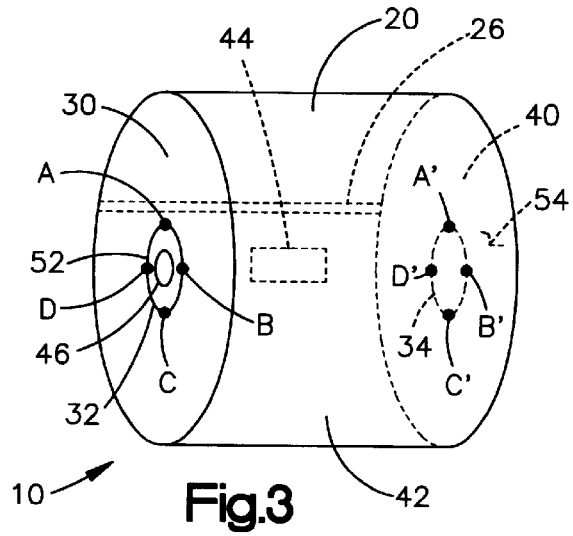
FIG. 3 is a view similar to FIG. 2 showing the protection device of FIG. 2 in a fully inflated condition.

The air bag 10 has a generally cylindrical configuration when fully inflated (FIG. 3). The air bag 10 includes a rectangular center panel 20 and circular first and second side panels 30 and 40. The center panel 20 has first and second opposite end portions sewn together at a seam 26. The first and second side panels 30 and 40 are sewn to the edges of the center panel 20 to form the cylindrical configuration of the air bag 10.

The air bag 10 as thus sewn defines an inflation fluid volume 42 for receiving inflation fluid from the inflator 14.

The center panel 20 has an inflation fluid opening shown schematically at 44 for receiving inflation fluid from the inflator 14 to inflate the air bag 10. The first side panel 30 has a vent 46 for discharging inflation fluid from the air bag 10. The vent 46 has a circular configuration centered in the first side panel 30.

Figure 2:
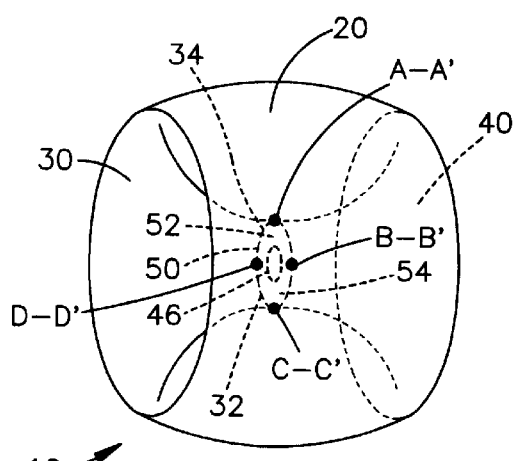
FIG. 2 is a pictorial view of an inflatable vehicle occupant protection device of the system of FIG. 1, shown in a partially inflated condition.

A set of first points on the first side panel 30, including representative points identified by the reference letters A, B, C, and D in FIGS. 2 and 3, lie along and define a closed plane figure, in this case, a circle 32.

A set of second points on the second side panel 40, including representative points identified by the reference numerals A', B', C', and D' in FIGS. 2 and 3, lie along and define a closed plane figure, in this case, a circle 34. The circle 34 is the same diameter as the circle 32. The first points A–D on the first side panel 30 correspond, as described below, with the second points A'–D' on the second side panel 40.

When the air bag is in the fully inflated condition shown in FIG. 3, the first points on the first side panel 30, including the points A, B, C, and D, are spaced apart from the second points on the second side panel 40, including the points A', B', C', and D'. That is, the distance between the points of each pair of corresponding first and second points A–A', or B–B', or C–C', or D–D', is greater than zero. In addition, the air bag 10 is sewn together in a manner such that the distance between the points of each pair of corresponding first and second points A–A', or B–B', or C–C', or D–D', is substantially the same as the distance between the points of each other pair of corresponding first and second points.

The air bag includes a rupturable stitching section 50. The rupturable stitching section 50 releasably joins the first side panel 30 of the air bag 10 with the second side panel 40 of the air bag when the air bag is uninflated and when it is partially inflated as in FIG. 2. The first side panel 30 and the second side panel 40 are pulled together in an overlying relationship in order to sew the rupturable stitching section 50. The stitching section 50 extends through the first side panel 30 and through the second side panel 40 of the air bag.

The stitching section 50 has a circular configuration. The stitching section 50 defines and encloses a circular central portion 52 of the first side panel 30 and a circular central portion 54 of the second side panel 40. The central portion 52 of the first panel 30 includes the vent 46.

The stitching section 50 extends through the set of first points on the first side panel 30, including the first points A, B, C, and D. The stitching section 50 also extends through the set of second points on the second side panel 40, including the second points A', B', C', and D'.

When the air bag 10 is in the partially inflated condition, the rupturable stitching section 50 acts as a tether to keep the first side panel 30 of the air bag adjacent the second side panel 40 of the air bag. The rupturable stitching section 50 does not rupture, and the air bag 10 stays in the partially inflated condition, so long as the force applied to the rupturable stitching section is not greater than a predetermined force. The air bag 10 has a first volume-that is, the inflation fluid volume 42 inside the air bag has a first magnitude.

When the air bag 10 is in the partially inflated condition, the stitching section 50 holds each one of the first points A–D closely adjacent a corresponding one of the second points A'–D'. For example, the first point A on the first side panel 30 overlies a corresponding second point A' on the second side panel 40. Because the stitching section 50 is unruptured, the distance between the first point A and the second point A' is zero. The first point B on the first side panel 30 overlies a corresponding second point B' on the second side panel 40. The distance between the first point B and the second points B' is zero.

The first point C on the first side panel 30 overlies a corresponding second point C' on the second side panel 40. The distance between the first point C and the second point C' is zero. The first point D on the first side panel 30 overlies a corresponding second point D' on the second side panel 40. The distance between the first point D and the second point D' is zero.

When the air bag 10 is in the partially inflated condition, the central portion 52 of the first side panel 30 overlies the central portion 54 of the second side panel 40. The rupturable stitching section 50 extends around and encloses the vent 46. As a result, the vent 46 is blocked from fluid flow through the vent when the rupturable stitching section 50 is not ruptured and the air bag 10 has the first volume. Specifically, the central portion 54 of the second side panel 40 blocks fluid flow through the vent 46. In addition, the vent 46 is not exposed to pressurized fluid from the interior of the air bag 10.

The stress on the stitching section 50, which extends through and joins the points A–D and A'–D' when the air bag 10 is in the partially inflated condition, is proportional to the distance that exists between the points A–D and A'–D' when the air bag is fully inflated. Specifically, if the air bag 10 were designed so that the points A and A' did not move away from each other at all when the air bag inflated fully, then the stress at the points A and A' would be zero when the air bag was in the partially inflated condition.

If the air bag 10 were designed so that the points A and A1 moved away from each other by only a relatively small amount when the air bag inflated fully, then the stress at the points A and A' would be relatively small when the air bag was in the partially inflated condition. Conversely, if the air bag 10 were designed so that the points A and A' moved away from each other by a relatively large distance when the air bag inflated fully, then the stress at the points A and A' would be relatively large when the air bag was in the partially inflated condition.

In the air bag 10, the joined points A–D and A'–D' all move away from each other by at least some distance when the air bag is fully inflated. In addition, the points A and A' move away from each other by substantially the same distance as the points B and B' move away from each other and as the points C and C' move away from each other and as the points D and D' move away from each other. Consequently, when the air bag 10 is in the partially inflated condition and the points A–D are joined with the points A'–D' by the rupturable stitching section 50, the stress on the rupturable stitching section is substantially the same at each one of the joined points A–D and A'–D' along the circles 32 and 34. The stress on the stitching section 50 is substantially uniform along the entire length of the stitching section.

A force greater than the predetermined force may be applied to the rupturable stitching section 50 if the pressure in the air bag 10 increases sufficiently, for example, because of actuation of a second stage of the inflator 14. If this occurs, the rupturable stitching 50 ruptures in response. Rupturing of the stitching section 50 enables movement of the first side panel 30 of the air bag 10 away from the second side panel 40. When this movement occurs, the air bag 10 assumes the fully inflated condition shown in FIG. 3. The volume of the air bag 10 increases from the first volume to a second volume, which is greater than the first volume. The vent 46 in the first side panel 30 is uncovered or opened. The vent 46 opens to an open condition to permit flow of pressurized fluid from the air bag 10 through the vent 46.

During the movement of the air bag 10 from the partially inflated condition to the fully inflated condition, it is desirable that the stitching section 50 open quickly and completely once the predetermined force level is reached, uncovering the vent opening 46 fully and in a short period of time. In the air bag 10, the uniformity of the stress on the stitching section 50 means that an application of force that is sufficient to rupture one of the stitches in the stitching section 50 is sufficient to rupture all the stitches in the stitching section. In addition, once one of the stitches in the stitching section 50 ruptures, the stress on the remaining stitches increases, resulting in all the stitches rupturing. Thus, the first and second side panels 30 and 40 move quickly and completely away from each other, uncovering and opening the vent opening 46 fully and quickly, as desired. Such a result might not occur if some of the stitches in the rupturable stitching section 50 were not stressed at all, or if the stress were uneven.

Figure 4:
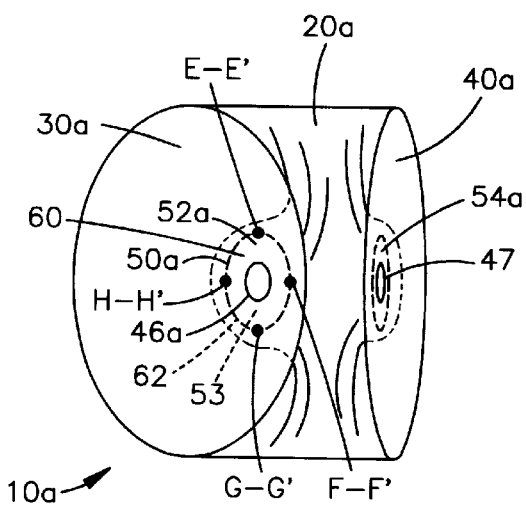
FIG. 4 is a pictorial view of a protection device in accordance with a second embodiment of the invention, shown in a partially inflated condition.
Figure 5:
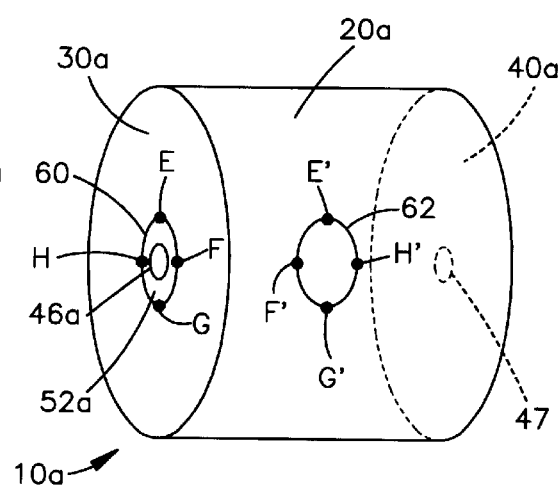
FIG. 5 is a view similar to FIG. 4 showing the protection device of FIG. 4 in a fully inflated condition.

FIGS. 4 and 5 illustrate an air bag 10a constructed in accordance with a second embodiment of the invention. The air bag 10a is similar in construction to the air bag 10 (FIGS. 2 and 3), and parts that are the same or similar are given the same reference numerals with the suffix "a" added for clarity.

The air bag 10a has the same cylindrical configuration as the air bag 10, including a rectangular central panel 20a sewn to circular first and second side panels 30a and 40a. The first side panel 30a has a first vent 46a for discharging inflation fluid from the air bag 10a. The first vent 46a has a circular configuration and is located near the outer periphery of the first side panel 30a. The second side panel 40a has a second vent 47 for discharging inflation fluid from the air bag 10a. The second vent 47 has a circular configuration and is located near the outer periphery of the second side panel 40a. The circular portion 54a of the second side panel 40a includes the vent 47. The construction and operation of the second vent 47 are the same as the construction and operation of the first vent 46a, and so are not described further herein.

The air bag 10a includes a first rupturable stitching section 50a, which releasably joins the first side panel 30a of the air bag with the center panel 20a of the air bag when the air bag is not fully inflated. The first side panel 30a and the center panel 20a are pulled together in an overlying relationship in order to sew the first rupturable stitching section 50a. The first rupturable stitching section 50a extends through the first side panel 30a and through the center panel 20a of the air bag.

The first rupturable stitching section 50a has a circular configuration and is located adjacent the seam between the first side panel 30a and the center panel 20a. The first rupturable stitching section 50a defines and encloses a circular portion 52a of the first side panel 30a and a circular portion 53 of the center panel 20a. The circular portion 52a of the first side panel 30a includes the vent 46a. The circular portion 53 of the center panel 20a overlies the circular portion 52a of the first side panel 30a. Thus, the first rupturable stitching section 50a extends around and encloses the vent 46a.

When the air bag 10a is in the partially inflated condition shown in FIG. 4, the first rupturable stitching section 50a acts as a tether to keep the first side panel 30a of the air bag adjacent the center panel 20a of the air bag. The rupturable stitching section 50a does not rupture, and the air bag 10a stays in the partially inflated condition, so long as the force applied to the rupturable stitching section is not greater than a predetermined force. When the air bag 10a is in this partially inflated condition, the air bag has a first volume— that is, the inflation fluid volume inside the air bag has a first magnitude.

Because the rupturable stitching section 50a extends around and encloses the vent 46a, the vent is blocked from fluid flow through the vent when the rupturable stitching section is not ruptured and the air bag 10a has the first volume. In addition, the vent 46a is not exposed to pressurized fluid from the interior of the air bag 10a.

The rupturable stitching section 50a defines a circle 60 on the first side panel 30a. A set of first points lie on the circle 60, including selected ones designated E, F, G and H. The rupturable stitching section 50a defines a circle 62 on the center panel 20a. A set of second points lie on the circle 62, including selected ones designated E', F', G' and H'. When the air bag 10a is in the partially inflated condition, the first points E–H overlie the second points E'–H'.

If a force greater than the predetermined force is applied to the rupturable stitching section 50a, the stitching section ruptures. This rupturing enables movement of the first side panel 30a of the air bag 10a away from the center panel 20a. The vent 46a in the first side panel 30a is uncovered or opened. The vent 46a opens to an open condition to permit flow of pressurized fluid from the air bag 10a through the vent.

All the first points E–H on the first side panel 30a move away from all the second points E'–H' on the center panel 20a. In contrast to the air bag 10, the distance by which some of the points E–H on the first circle 60 in the air bag 10a move away from their corresponding points E'–H' on the second circle 62 is different from the distance by which others of the points E–H on the first circle 60 move away from their corresponding points E'–H' on the second circle 62. Nevertheless, the entire stitching section 50a is stressed when the air bag 10a is partially inflated. Once one of the stitches in the stitching section ruptures, the stress on the remaining stitches increases, resulting in all the stitches rupturing. Thus, the first side panel 30a moves quickly and completely away from the center panel 20a, uncovering and opening the vent opening 40a fully and quickly, as desired.

FIGS. 6–9 illustrate an air bag 10d constructed in accordance with a third embodiment of the invention. The air bag 10d is similar in construction to the air bag 10 (FIGS. 2 and 3), and parts that are the same or similar are given the same reference numerals with the suffix "d" added for clarity.

The air bag 10d includes a rectangular center panel 20d and two circular side panels 30d and 40d, joined in a cylindrical configuration. The first side panel 30d includes a vent 46d.

The air bag 10d includes a tether 90. As illustrated in FIG. 8, the tether 90 is a piece of fabric material having a first end portion 92 sewn to the first side panel 30d with a rupturable stitching section 94. A second end portion 96 of the tether 90 is sewn to the second side panel 40d with a permanent (non-rupturable) stitching section 98. A central portion 100 of the tether 90 extends between the first and second end portions 92 and 96.

The vent 46d is covered by the first end portion 92 of the tether 90 when the tether is joined to the first side panel with the rupturable stitching section 94. The first end portion 92 of the tether 90 blocks fluid flow through the vent 46d. In addition, the vent 46d is not exposed to pressurized fluid from the interior of the air bag 10d.

If a force greater than a predetermined force is applied to the rupturable stitching section 94, for example, because of actuation of a second stage of an inflator, the rupturable stitching section ruptures in response. Rupturing of the stitching section 94 enables movement of the tether 90 and the second side panel 40d of the air bag 10d away from the first side panel 30d. When this movement occurs, the volume of the air bag 10d increases from a first volume to a second volume, and the air bag assumes the fully inflated condition shown generally in FIG. 7. In addition, the vent 46d in the first side panel 30d is uncovered or opened as the tether 90 pulls away from the first side panel of the air bag. The vent 46d opens to an open condition to permit flow of pressurized fluid from the air bag 10d through the vent.

The stitching section 94 joins a plurality of points on the tether 90 with a corresponding plurality of points on the first side panel 30d. When the stitching section 94 ruptures, the tether 90 moves completely out of contact with the first side panel 30d. All the points on the tether 90 that were joined by the stitching section to the first side panel 30d, move away from the corresponding points on the first side panel to which they were joined. As a result, the vent 46d can open quickly and completely.

In the alternative embodiment shown in FIG. 9, the central portion 100 of the tether 90 is illustrated as being folded over and sewn to itself with a second rupturable stitching section 102. The second rupturable stitching section 102 is rupturable upon the application of a second predetermined force. The second predetermined force is less than the predetermined force needed to rupture the rupturable stitching section 98 joining the tether 90 to the first side panel 30d. As a result, the rupturable stitching section 102 in the central portion 100 of the tether 90 opens before the tether pulls away from the first side panel 30d of the air bag 10d.

The air bag 10d is illustrated in a first partially inflated condition in FIG. 9. Neither of the rupturable stitching sections 98 and 102 is ruptured. The air bag 10d has a first volume.

In response to a further increase in fluid pressure inside the air bag 10d, the rupturable stitching section 102 in the central portion 100 of the tether 90 is rupturable to enable lengthening of the tether. The inflated volume of the air bag 10d increases from the first volume to an intermediate volume that is less than the air bag's fully inflated volume. The vent 46d remains closed when the air bag 10d has the intermediate volume (that is, when the rupturable stitching section 102 is ruptured and the rupturable stitching section 100 is not).

In response to a still further increase in fluid pressure inside the air bag 10d, the rupturable stitching section 98 holding the tether 90 to the first side panel 30d ruptures. The tether 90 pulls completely away from the first side panel 30d, as described above, and the inflated volume of the air bag 10d increases from the intermediate volume to the fully inflated volume. The vent 46d is uncovered and opens to an open condition to permit flow of pressurized fluid from the air bag 10d through the vent.

FIGS. 10 and 11 illustrate a portion of an air bag 10e constructed in accordance with a fourth embodiment of the present invention. The illustrated portion is a tether 110 and its connection between two side panels 30e and 40e of an air bag that is otherwise similar in construction to the air bag 10d.

The first side panel 30e (FIG. 10) has a vent 112. The vent 112 comprises a slit in the first side panel 30e between two edge portions 114 and 116 of the side panel. When the fabric of the first end panel 30e is unstressed, the vent 112 is in a closed condition as shown in FIG. 10. The two edge portions 114 and 116 of the side panel 30e are adjoining. A plurality of discrete eyelets or lacing openings 118 are formed in the edge portions 114 and 116.

The tether 110 has a first end portion 120 that extends through, or is laced through, the eyelets 118 in the edge portions 114 and 116. The tether 110 secures together the edge portions 114 and 116 of the side panel 30e. A second end portion 122 of the tether 110 is sewn to the second side panel 40e with a permanent stitching section 124.

The air bag 10e is illustrated in a first partially inflated condition in FIG. 11. The tether 110 extends through the eyelets 118, securing together the edge portions 114 and 118 of the side panel. A plurality of points on the first end portion 120 of the tether 110 are in engagement with a plurality of points on the side panel 30e. The vent 112 is closed, and the air bag 10e has a first volume.

In response to an increase in fluid pressure inside the air bag 10e, a force exceeding a predetermined force is applied to the tether 110. The first end portion 120 of the tether 110 is pulled through (out of) the eyelets 118. All the points on the tether 110 move away from all the points on the first side panel 30e. The tether 110 pulls completely away from the first side panel 30e, as described above, and the inflated volume of the air bag 10e increases. The vent 112 opens to an open condition to permit flow of pressurized fluid from the air bag 10e through the vent.

From the above description of the invention, those skilled in the art will perceive improvements, changes and modifications in the invention. Such improvements, changes and modifications within the skill of the art are intended to be covered by the appended claims.

Having described the invention, we claim:

1. An inflatable vehicle occupant protection device for helping to protect an occupant of a vehicle, said device being inflatable from a deflated condition through a partially inflated condition to a fully inflated condition by inflation fluid from an inflation fluid source, said device comprising:

flexible material defining an inflation fluid volume for receiving inflation fluid, said material including a first panel portion on which is located a set of first points and a second panel portion on which is located a set of second points;

a rupturable stitching section holding said set of first points closely adjacent said set of second points when said device is in the deflated condition and when said device is in the partially inflated condition;

said rupturable stitching section being rupturable in response to the application of a force greater than a predetermined force in response to inflation of said protection device to enable movement of said first panel portion away from said second panel portion thereby to enable movement of said device from the partially inflated condition to the fully inflated condition;

all of said first points on said first panel portion moving away from all of said second points on said second panel portion when said rupturable stitching section ruptures and said device moves from the partially inflated condition to the fully inflated condition; and said device including a vent in said material for discharging inflation fluid from said device, said vent being blocked from fluid flow through said vent when said rupturable stitching section is not ruptured and said device is in the partially inflated condition, said vent opening to an open condition to permit flow of pressurized fluid from said device through said vent in response to rupturing of said rupturable stitching section and movement of said device from the partially inflated condition to the fully inflated condition;

said device having a cylindrical configuration including a center panel and first and second side panels, said first portion of said material being said first side panel of said device, said vent being located on said first side panel, said second portion of said material being a selected one of said center panel and said second side panel of said device, said rupturable stitching section extending through said first side panel and through said selected one of said center panel and said second side panel of said device, said rupturable stitching section extending around and enclosing said vent.

2. An apparatus as set forth in claim 1 wherein said second portion of said material is said second side panel of said device, said rupturable stitching section extending through said first side panel and through said second side panel of said device.

3. An apparatus as set forth in claim 1 wherein said second portion of said material is said center panel of said device, said rupturable stitching section extending through said first side panel and through said center panel of said device.

4. An inflatable vehicle occupant protection device for helping to protect an occupant of a vehicle, said device being inflatable from a deflated condition through a partially inflated condition to a fully inflated condition by inflation fluid from an inflation fluid source, said device comprising:

flexible material defining an inflation fluid volume for receiving inflation fluid, said material including a first panel portion on which is located a set of first points and a second panel portion on which is located a set of second points;

a rupturable stitching section holding said set of first points closely adjacent said set of second points when said device is in the deflated condition and when said device is in the partially inflated condition;

said rupturable stitching section being rupturable in response to the application of a force greater than a predetermined force in response to inflation of said protection device to enable movement of said first panel portion away from said second panel portion thereby to enable movement of said device from the partially inflated condition to the fully inflated condition;

all of said first points on said first panel portion moving away from all of said second points on said second panel portion when said rupturable stitching section ruptures and said device moves from the partially inflated condition to the fully inflated condition; and said device including a vent in said material for discharging inflation fluid from said device, said vent being blocked from fluid flow through said vent when said rupturable stitching section is not ruptured and said device is in the partially inflated condition, said vent opening to an open condition to permit flow of pressurized fluid from said device through said vent in response to rupturing of said rupturable stitching section and movement of said device from the partially inflated condition to the fully inflated condition;

each one of said first points being directly on top of a corresponding one of said second points when said device is in the deflated condition and when said device is in the partially inflated condition, and wherein the distance between each pair of corresponding first and second points is substantially the same as the distance between each other pair of corresponding first and second points directly on top of each other when said device is in the fully inflated condition.

5. A protection device as set forth in claim 4 wherein said set of first points defines a closed plane figure.

6. A protection device as set forth in claim 5 wherein said set of second points defines a closed plane figure substantially identical to the closed plane figure defined by said set of first points.

7. An apparatus as set forth in claim 4 wherein said vent has a circular configuration and said rupturable stitching section has a circular configuration extending around and enclosing said vent.

* * * * *